Oct. 4, 1960 S. STOKLAND 2,954,902
DISPENSER FOR AGRICULTURAL MACHINES
Filed Nov. 5, 1957
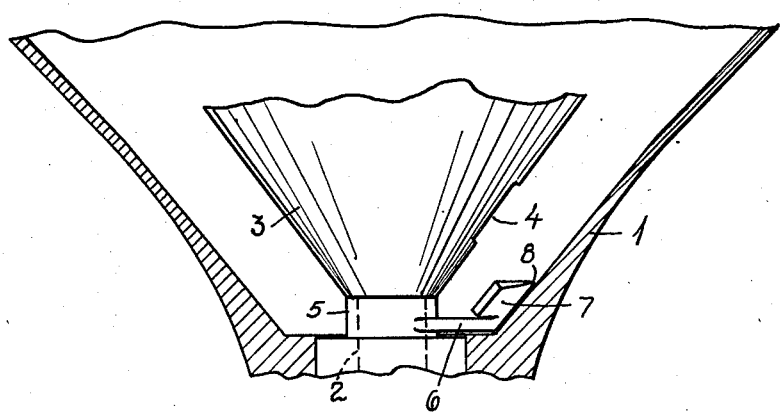
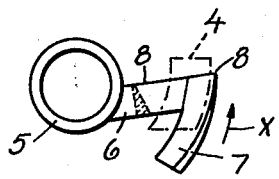
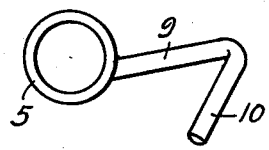 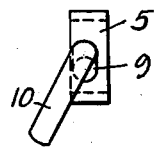
INVENTOR
SIGMUND STOKLAND
BY
HIS AGENT

United States Patent Office 2,954,902
Patented Oct. 4, 1960

2,954,902

DISPENSER FOR AGRICULTURAL MACHINES

Sigmund Stokland, Hygaids Alle 3, Oslo, Norway

Filed Nov. 5, 1957, Ser. No. 694,584

Claims priority, application Norway Nov. 7, 1956

3 Claims. (Cl. 222—239)

The present invention relates to a dispenser for agricultural machines for use as a seed planter and/or fertilizer distributor.

The dispenser of the present invention constitutes an improvement over the dispenser disclosed in my co-pending application Serial No. 575,446, filed April 2, 1956, now Patent No. 2,874,878, issued February 24, 1959, which relates to a machine having a container receiving the material intended for distribution by said machine, a plurality of material receiving devices, an upwardly diverging substantially cup-shaped member in the container mounted for rotation about its axis of symmetry, the cup-shaped member having an upper part terminating in an open top and a lower part having at least one opening therein, the material receiving devices being in communication with the container in the proximity of the upper edge of the cup-shaped member, separator means in the container spaced from the open top of the cup-shaped member for guiding the material intended for distribution to the exterior of the cup-shaped member and through the opening into the cup-shaped member, whereby the material in the cup-shaped member flows upwardly toward and past the upper edge thereof and into the material receiving devices when the cup-shaped member is rotated.

Experience has shown that in machines of the type above referred to the flow of material through the opening in the cup-shaped member is not maintained with the desired uniformity in connection with all types of seeds.

Thus, when sowing steeped seeds more or less of the steeping material is separated from the seeds and accumulates at the bottom of the storing container interfering thereby with the determined inflow of seeds to and through the opening in the rotating cup-shaped member.

An important object of the present invention is to provide a device capable of eliminating the above-mentioned drawback of known dispensers and capable of effecting that separated steeping material is carried together with the seeds into the rotating cup-shaped member through the opening therein.

According to the invention there is provided a stirring member connectible for rotation with the rotating member and provided with an inclined or curved upper surface. The stirring member is mounted in such position below the supply opening of the rotating member that it during rotation conveys a continuous stream of seed towards the supply opening.

The stirring member is positioned substantially radially with respect to the axis of rotation of the cup-shaped member, and is provided at its outer end with an extension projecting rearwardly and upwardly with respect to the direction of rotation of the cup-shaped member; the extension preferably forms an acute angle with the longitudinal direction of the main body portion of the stirring member and with a horizontal plane.

For better understanding of the invention reference will now be made to the accompanying drawing showing two embodiments of my improved dispenser, and in which:

Figure 1 is a side view, partly in vertical, axial section, of the lower part of the storing container and of the rotating cup-shaped member.

Figure 2 is a plan view of the stirring member, and

Figures 3 and 4 are a plan view and side view, respectively, of a modified stirring member.

In the drawing, 1 indicates the lower conical portion of the storing container through the bottom of which a shaft 2 projects upwardly carrying at its upper end the rotating cup-shaped member 3 having in the embodiment shown a single supply opening 4.

According to the invention, a stirring member is positioned in container 1 below the supply opening 4 of the cup-shaped member 3 and is connected thereto. In the embodiment shown in Figs. 1 and 2, the stirring member comprises a hub or sleeve 5 supported on shaft 2 and secured thereto in any suitable manner. Projecting substantially radially from sleeve 5 is an arm 6 which at its outer end is provided with an extension projecting rearwardly with respect to the direction of rotation of shaft 2, as is indicated by the arrow X in Fig. 2.

The free end of arm 6 of the stirring member is connected to or integral with an extension 7 having a lower or outer surface which, in the radial direction of the container 1, follows the outline of the latter's lower portion with necessary moving clearance, and a wedge-shaped cross-section the pointed edge 8 of which is directed against the moving direction as shown by the cross-section illustrated in broken lines in Fig. 2.

The stirring member is so disposed with respect to the supply opening 4 of the rotating member 3, that its front edge 8 is situated somewhat to the rear of the front side edge of opening 4 as shown in Fig. 2. The distance between the front edge of opening 4 and the edge 8 of the stirring member may correspond to about one third of the length of opening 4 in the circumferential direction of the member 3.

During the rotation of the cup-shaped member 3 the blade or arm 6 of the stirring member rotates along the bottom of the container 1, positioned below the opening 4 as above stated, effecting thereby that seed in the container 1 is guided upwardly along the upwardly and outwardly inclined upper surface of the extension 7 and is directed in a stream upwardly against the opening 4. Because the blade or arm 6 is positioned close to the bottom surface of the container 1, eventually separated steeping material is also guided by arm 6 together with the seeds and is thereby prevented from accumulation at the bottom of the container, whereby any interference with the determined supply through the opening 4 is avoided.

By reason of the inclined position of the extension 7 the latter during its rotation carries the seed inwardly into the path of the arm 6 and insures the supply of seed thereto during the relatively great rotating velocity of the stirring member.

From the above it will be understood that the stirring member or blade provides a more exact supply, not only of steeped seeds but of seeds of all kinds because it brings about a constant stream directed upwardly against the supply opening 4 of the rotating member 3.

The stirring member may also be formed as a rod 9 having circular cross-section and projecting substantially radially from the sleeve 5. The curved upper side of rod 9 brings about the desired upwardly directed stream of seed in the manner above described.

In order to insure also in this case that seed is guided inwardly into the path of moving rod 9, the outer end portion 10 of the rod is bent slantingly backwards and upwards and forms an acute angle with the rod 9. In this case the rod 9 may be positioned at some distance above the bottom surface of the container 1.

When the free area of the opening 4 is regulated by means of a rotatable closure funnel carried at the upper end of a hollow shaft which is co-axial with the shaft 2, the stirring member may be connected to the hollow shaft and will follow the latter's movements with respect to the opening.

I claim:

1. In a dispenser for agricultural machines, in combination: a supply container in which the material intended for distribution is stored; an upwardly diverging substantially cup-shaped member in said container having a substantially vertical axis of symmetry and mounted for rotation about said axis, said member having a lower part defining at least one opening through which the material may freely enter from the container; and stirring means in said container connected for rotation with said member and located substantially beneath said opening and underlying said opening for guiding the material from the container in a continuous stream toward and through the opening and upwardly into said member when the member is rotated, said stirring means comprising an arm having an end distant from the cup shaped member and an extension connected with said end and disposed below said opening and extending rearwardly with respect to the direction in which said member rotates, said extension having a surface inclined upwardly and away from the axis of said member.

2. The structure of claim 1, said arm extending radially from the axis of said member, said extension being bent upwardly from said arm at an acute angle.

3. The structure of claim 1; said extension comprising an arcuate plate tapering rearwardly from said direction of rotation.

References Cited in the file of this patent

UNITED STATES PATENTS

| | | |
|---|---|---|
| 555,896 | Crane | Mar. 3, 1896 |
| 1,311,227 | Hartman | July 29, 1919 |